Patented Mar. 16, 1954

2,672,479

UNITED STATES PATENT OFFICE 2,672,479

HYDRAZINIUM HYDRAZONES OF SATURATED DIBASIC ORGANIC ACIDS

Richard L. Doerr, Niagara Falls, N. Y., assignor to Mathieson Chemical Corporation, a corporation of Virginia No Drawing. Application August 23, 1951,
Serial No. 243,353

4 Claims. (Cl. 260—501)

My invention relates to new chemical compounds which have particular utility when used as fluxes in the soft soldering of metals.

Fluxes for soft soldering should be fluid at temperatures below the solidifying point of the solder in order to avoid occlusion of the flux in the solder and also in order that the flux will spread and clean the metal before the solder comes in contact with it. Thus the flux should have a solvent or slagging action on the oxides of metals and other surface coatings in order to remove them effectively and permit contact of the solder with the otherwise clean metal. It should also prevent reoxidation of the metal surface during the soldering operation. In addition, the flux should reduce the surface tension of the molten solder and be capable of being displaced from the solid metal by the solder to form a good bond. Preferably the flux should be noncorrosive and its products of decomposition on heating to soldering temperatures should be noncorrosive in order to avoid the necessity of extreme precautions in cleaning the bonded article subsequent to the soldering operation.

Certain of the conventional soldering fluxes presently in use exhibit some of these desirable characteristics, but as far as is known none possesses all of them. For example, zinc chloride is extensively used as a flux. However, it suffers from the disadvantages that its melting point is higher than the melting point of a number of common solders and that it is extremely corrosive. Ammonium chloride added to zinc chloride aids in reducing the melting temperature of zinc chloride but contributes no fluxing action to the composition and is also extremely corrosive. Although rosin is useful as a flux in soldering metals which have previously been cleaned, and is substantially non-corrosive, it has little solvent or cleaning action on metal oxides. In addition, vehicles for the commonly used fluxes, such as water, alcohols and waxes, may increase the ease of application of the flux but appear to contribute nothing to the fluxing action.

In accordance with the present invention, I have prepared certain hydrazinium hydrazones of saturated dibasic organic acids and I have discovered that these particular hydrazones, either alone or in admixture with relatively large proportions of suitable diluents such as rosin, fulfill the requirements mentioned above for soldering fluxes. The hydrazones of my invention are fluid at relatively low temperatures, have a solvent or slagging action on oxides of metals or other surface coatings, spread well to prevent reoxidation of the metal surface during soldering, aid in the formation of a strong bond between the solder and the solid metal, and leave no corrosive or otherwise objectionable residues. Although the compounds of my invention are especially suitable for use in soldering with soft solders, their utility is not limited to use in soft soldering only.

The compounds of my invention are those of the generic formula:

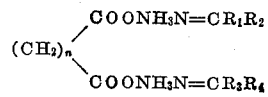

in which $n$ is an integer from 1 to 8 inclusive and in which $R_1$ and $R_3$ are alkyl radicals and $R_2$ and $R_4$ are hydrogen atoms or alkyl radicals, preferably methyl. However, the sum of the number of carbon atoms in $R_1$ plus the number of carbon atoms in $R_2$ should not exceed 14, and likewise the number of carbon atoms in $R_3$ plus the number of carbon atoms in $R_4$ should not exceed 14.

The compounds of my invention can be prepared, for example, by either of two convenient methods. An aldehyde or a ketone can be heated with a dihydrazinium salt of the dibasic organic acid. In the alternative, the hydrazone of the carbonyl compound may be first formed and converted into the salt by the addition of the stoichiometric amount of the dibasic acid. However, where the carbonyl compound is an aldehyde it is preferable to use the first method, since the primary reaction product of an aliphatic aldehyde with hydrazine is an azine rather than a hydrazone, although in some cases the hydrazone may be obtained from the azine by treatment with excess hydrazine. Where the carbonyl compound is a ketone either method may be employed since the primary reaction product of a ketone with hydrazine is the hydrazone and not the ketazine.

The preparation of my novel compounds is illustrated in the following examples.

*Example I*

Acetone hydrazone was prepared by adding 32 parts by weight of anhydrous hydrazine to 58 parts by weight of acetone. The reaction product, acetone hydrazone, was obtained by distillation of the mixture. Acetone hydrazone boils at 124–5° C. To the distillate was added 73 parts by weight of adipic acid. The heat of neutralization served to raise the temperature of the mixture until the adipic acid dissolved and on cooling the mixture solidified. The diacetone hydrazone dihydrazinium adipate was thereafter recrystallized from methanol.

*Example II*

One mol of adipic acid was dissolved in 250 ml. of methanol and neutralized with 2 mols of 95% hydrazine. Two mols of acetone were added and the solution cooled to room temperature when the diacetone hydrazone dihydrazinium adipate crystallized. Before use, the product was filtered and dried.

The compound prepared in Example I was admixed with isopropanol and rosin and was tested by placing a 0.2 gram piece of solder (30% tin–70% lead) on a small piece of tinplate, adding 5 drops of a flux solution, and placing the tin plate on a hot plate at 350° C. The solder melted and spread to its maximum area in approximately 30 seconds. The tin plate was removed from the hot plate after about 1 minute, allowed to cool, and the area covered by the solder measured by means of a planimeter. Three types of tinplate were used in the tests. Types No. 1 and No. 2 were similar commercial tinplates differing in that No. 2 had twice the thickness of tin as No. 1. No. 3 was a hot dipped tinplate bearing a still greater thickness of tin. The following table shows the composition of the fluxes used and the spread areas measured.

| Flux No. | Composition, Percent | | | Spread Area (in square inches) on Tin Plate No | | |
|---|---|---|---|---|---|---|
| | i-PrOH | Rosin | Product of Example I | 1 | 2 | 3 |
| 1 | 50 | 40 | 10 | 0.44 | 0.49 | 0.73 |
| 2 | 50 | 45 | 5 | .41 | .52 | .69 |
| 3 | 50 | 50 | 0 | .26 | .31 | .66 |

The advantage of the compounds of the present invention is shown particularly in the case of the thin tin plate No. 1 where the spreading area of the solder under comparable conditions was increased to about 160% of the area obtained using rosin alone as flux.

The soldering effectiveness of the new compounds alone was tested as follows:

Two pieces of tinplate each 2" x 2" were soldered by melting a portion of the product of Example I and a small bit of solder between the squares. On cooling, it was determined that a strong bond was formed uniformly over the common area.

Various modifications can be made in the specified procedures of the examples to provide other compounds which fall within the scope of my invention. Thus, in place of the adipic acid there can be substituted, for example, malonic, succinic, glutaric, pimelic, suberic, azelaic or sebacic acids. In place of the acetone there can be substituted an aldehyde such as propionaldehyde, butyraldehyde, 2-ethyl butyraldehyde, n-hexaldehyde, and 2-ethyl hexaldehyde or a ketone such as methyl ethyl ketone, diethyl ketone, isopropyl ketone, isobutyl ketone, ethyl butyl ketone, diisobutyl ketone, trimethyl acetone and nonanone.

I claim:

1. The compounds of the general formula:

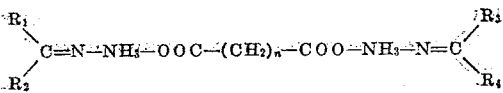

in which n is an integer from 1 to 8 inclusive and in which $R_1$ and $R_3$ are alkyl radicals and $R_2$ and $R_4$ are selected from the group consisting of the hydrogen atom and alkyl radicals, with the proviso that the sum of the number of carbon atoms in $R_1$ plus the number of carbon atoms in $R_2$ not exceed 14, and likewise that the number of carbon atoms in $R_3$ and $R_4$ not exceed 14.

2. The compounds of claim 1 when $R_1$ and $R_3$ are alkyl radicals and $R_2$ and $R_4$ are hydrogen atoms.

3. The compounds of claim 1 when $R_1$ and $R_3$ are alkyl radicals and $R_2$ and $R_4$ are methyl radicals.

4. Diacetone hydrazone dihydrazinium adipate of the formula:

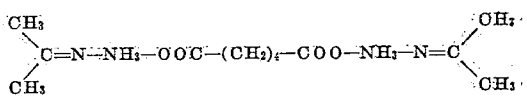

RICHARD L. DOERR.

References Cited in the file of this patent

Du Pont de Nemours and Co., Chem. Abs., vol. 43, col. 670 (1949).